(12) United States Patent
Lin

(10) Patent No.: US 6,378,880 B1
(45) Date of Patent: Apr. 30, 2002

(54) FOLDING DEVICE FOR A SKATE BOARD SCOOTER

(76) Inventor: Chao Ming Lin, No. 3, Lane 74, Chu-Wei-Nan Street, Kang-Shan, Kaohsiung Hsien (TW)

( * ) Notice: Subject to any disclaimer, the term of this patent is extended or adjusted under 35 U.S.C. 154(b) by 4 days.

(21) Appl. No.: 09/629,130

(22) Filed: Jul. 31, 2000

(51) Int. Cl.[7] ................................................. B62M 1/00
(52) U.S. Cl. ................................................... 280/87.05
(58) Field of Search ......................... 280/87.01, 87.021, 280/87.041, 87.05, 655.1; 403/85, 87, 327, 330

(56) References Cited

U.S. PATENT DOCUMENTS

| | | | | |
|---|---|---|---|---|
| 4,421,302 A | * | 12/1983 | Grimm et al. | ................. 403/87 |
| 4,707,884 A | * | 11/1987 | Chang | ................... 280/87.041 |
| 4,836,604 A | * | 6/1989 | Romano | ..................... 403/87 |
| 5,409,321 A | * | 4/1995 | Chen | .......................... 403/330 |
| 5,775,452 A | * | 7/1998 | Patmont | ................ 280/87.041 |
| 6,168,175 B1 | * | 1/2001 | Lan | ....................... 280/87.042 |
| 6,173,976 B1 | * | 1/2001 | Lee | .......................... 280/87.05 |
| 6,179,307 B1 | * | 1/2001 | Mao | ....................... 280/87.041 |
| 6,193,248 B1 | * | 2/2001 | Liu | ......................... 280/87.041 |
| 6,206,387 B1 | * | 3/2001 | Tsai | ....................... 280/87.041 |
| 6,234,501 B1 | * | 5/2001 | Chen | ..................... 280/87.041 |

FOREIGN PATENT DOCUMENTS

| | | | | |
|---|---|---|---|---|
| AT | 224283 | * | 4/1962 | ............ 280/87.041 |
| CH | 224093 | * | 1/1943 | .............. 280/87.01 |
| FR | 2607089 | * | 5/1988 | ............ 280/87.041 |

* cited by examiner

*Primary Examiner*—Frank Vanaman
(74) *Attorney, Agent, or Firm*—Alan Kamrath; Rider, Bennett, Egan & Arundel, LLP

(57) ABSTRACT

A skate board scooter includes a board having two mounting plates extended from an underside thereof. Two side plates are provided and each has a lower end extended through an opening of the board and securely attached to an associated mounting plate. A sleeve that rotatably holds a steering rod assembly includes two wings extended from an outer periphery thereof. Each wing is pivotally attached between the side plates. An engaging member includes a first end releasably engaged with notches defined in the wings and a second end pivotally attached between the side plates. A quick release assembly is mounted to the side plates for releasably retaining the wings in place relative to the side plates when the quick release assembly is in a locking state. The wings are pivotally movable relative to the side plates when the quick release assembly is in a release state.

9 Claims, 8 Drawing Sheets

FOLDING DEVICE FOR A SKATE BOARD SCOOTER

BACKGROUND OF THE INVENTION

1. Field of the Invention

The present invention relates to a folding device for a skate board scooter such that the skate board scooter can be manufactured without the need of any welding or soldering work.

2. Description of the Related Art

Skate board scooters are very popular recently and most of them require welding or soldering work. Improper or poor welding or soldering would adversely affect the structural strength of the skate board scooter. In some cases the buyers would reject goods with deficient welding/soldering work. In addition, skilled workers are required to proceed with welding/soldering, which is often time-consuming and labor-intensive. The manufacture cost is thus relatively high.

SUMMARY OF THE INVENTION

It is the primary object of the present invention to provide a folding device for a skate board scooter such that the skate board scooter can be manufactured without the need of any welding or soldering work.

A skate board scooter in accordance with the present invention comprises:

a board including an opening, the board further including two mounting plates extended from an underside thereof;

two side plates each having a lower end extended through the opening of the board and securely attached to an associated said mounting plate;

a steering rod assembly;

a sleeve rotatably holding the steering rod assembly, the sleeve including two wings extended from an outer periphery thereof, each said wing being pivotally attached between the side plates, each said wing including a notch;

an engaging member including a first end releasably engaged with the notches of the wings and a second end pivotally attached between the side plates; and a quick release assembly mounted to the side plates for releasably retaining the wings in place relative to the side plates when the quick release assembly is in a locking state, the wings being pivotally movable relative to the side plates when the quick release assembly is in a release state.

At least one spacer tube is mounted between the side plates and at least one spacer tube is mounted between the wings. Each side plate includes a cutout in an outer surface thereof. A plurality of blocks are formed in each cutout, a fixing hole being defined between two adjacent blocks. The opening of the board is defined by two lateral sides each having a plurality of indents, thereby defining a protrusion between each two adjacent indents. Each indent is engaged with an associated block, and each protrusion is engaged with an associated fixing hole.

Each side plate includes an arcuate slot in an upper end thereof. The quick release assembly includes a washer mounted to an outer surface of one of the side plates, a quick release rod extended through the washer and the arcuate slots with an end thereof extended beyond an outer surface of the other side plate, a nut securely engaged with the end of the quick release rod, and a quick release lever attached to the other end of the quick release rod. The quick release lever is manually pivotable between the locking state and the release state.

A spacer tube mounted between the wings and the quick release rod extends through the spacer tube. A spring includes a first end attached to the spacer tube and a second end attached to the engaging plate. The engaging plate includes a transverse hole in which a pin is mounted. The engaging plate further includes a notch defined in a side thereof that faces the wings, the notch being communicated with the transverse hole. The second end of the spring is attached to the pin via the notch.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
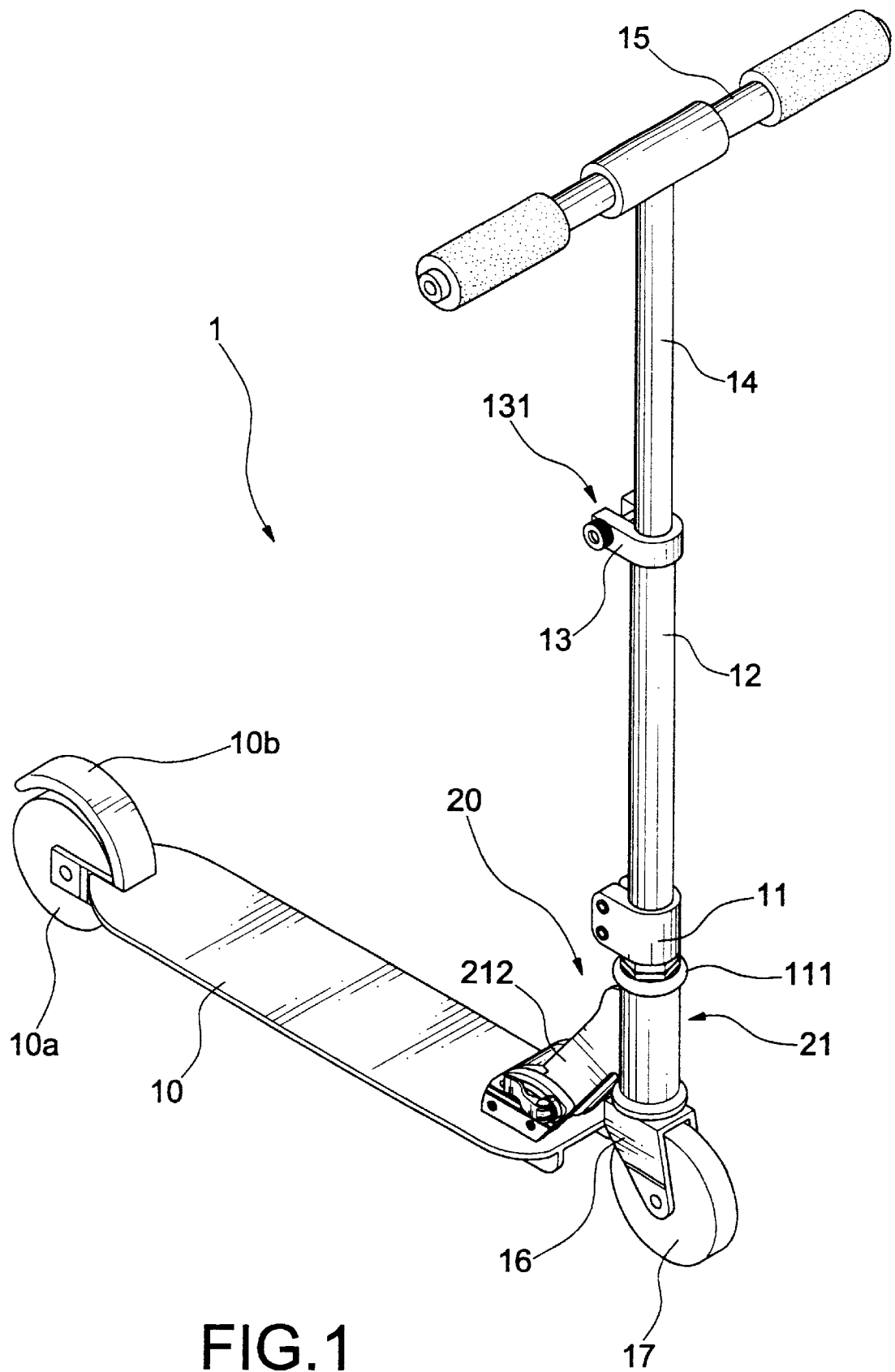
FIG. 1 is a perspective view of a skate board scooter in accordance with the present invention.

Referring to FIG. 1, a skate board scooter in accordance with the present invention generally includes a board 10, a steering rod assembly, and a folding device 20. The steering rod assembly includes a lower tube 12, an upper tube 14 telescopically received in the lower tube 12, and a handlebar 15 attached to the upper tube 14 to move therewith. The height of the upper tube 14 is adjustable by a clamping means 13 with a quick release 131. The lower rod 12 includes an axle 111 securely attached to a lower end thereof by a clamping means 11. The axle 111 is provided with a bearing (not labeled) and has a front wheel frame 16 securely attached to a lower end thereof for mounting a front wheel 17. Thus, moving direction of the front wheel 17 is controllable by the handlebar 15. The board 10 further includes a rear wheel 10a with a brake 10b attached to a rear end thereof.

Figure 2:
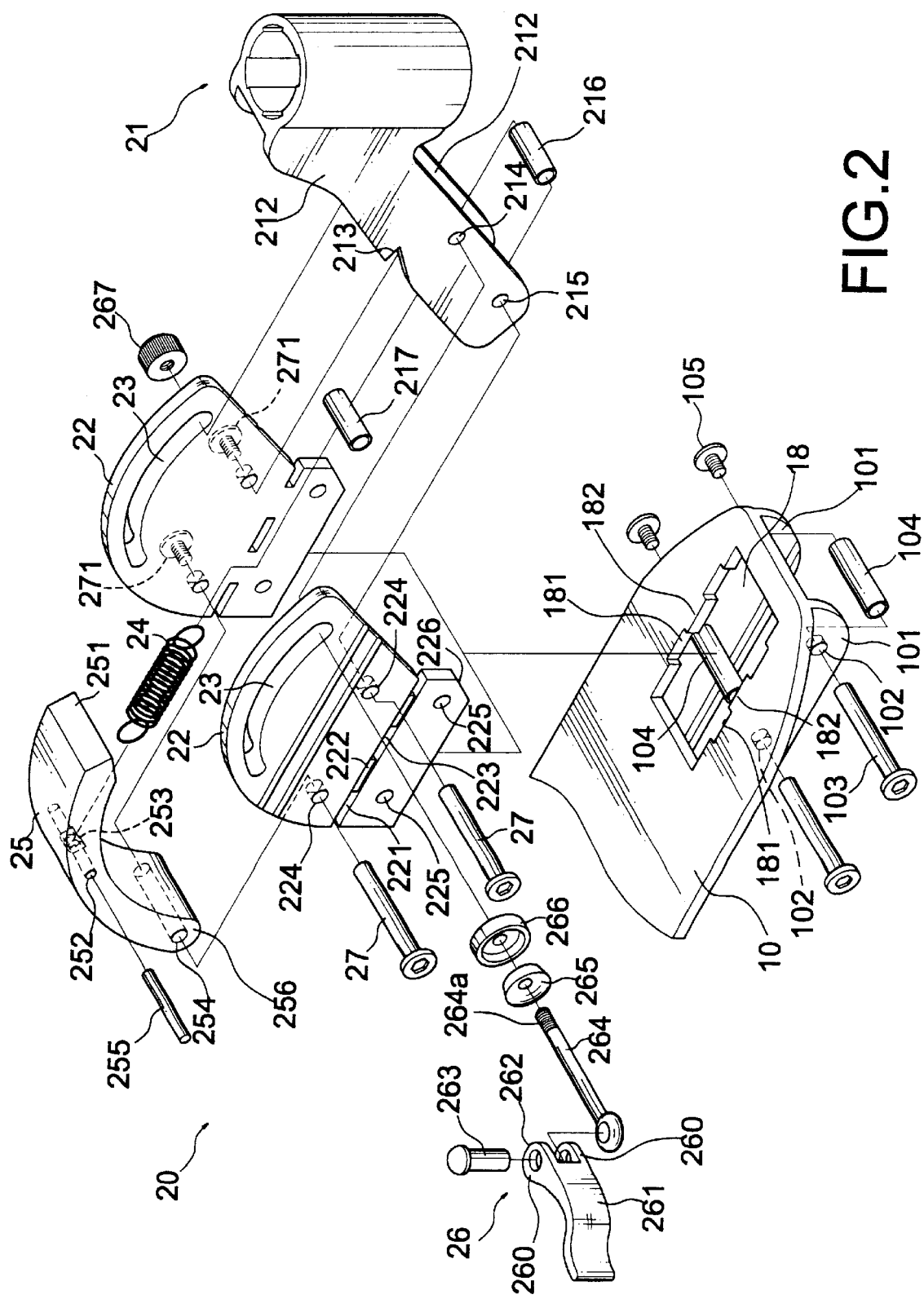
FIG. 2 is an exploded perspective view of a folding device of the skate board scooter in accordance with the present invention.

Referring to FIG. 2, the folding device 20 comprises a sleeve 21, two side plates 22, an engaging plate 25, and a quick release assembly 26. The sleeve 21 is mounted around and thus pivotally supports the axle 111. Namely, the axle 111 is pivotally held in the sleeve 21. Two parallel wings 212 extend from an outer periphery of the sleeve 21 and each includes a notch 213. The wings 212 further include first aligned holes 214 and second aligned holes 215.

Each side plate 22 includes a cutout 221 in an outer surface thereof. A plurality of blocks 222 are provided in each cutout 221, and each two adjacent blocks 222 have a fixing hole 223 therebetween. The side plates 22 include aligned arcuate slots 23 in upper ends thereof. The side plates 22 further include aligned holes 224 and 225 that are located on both sides of respective cutouts 221. Each side plate 22 further includes a chamfer 226 in a front edge of a lower end.

The engaging plate 25 is arcuate and includes a first end 251 for releasably engaging with the notches 213 of the wings 212. The engaging plate 25 further includes a transverse hole 254 in a second end 256 thereof and a transverse hole 252 in a mediate portion thereof. A notch 253 is defined in a side of the engaging plate 25 facing the wings 212 and communicates with the transverse hole 252. A pin 255 is extended through the transverse hole 252. A spring 24 is attached at one end to the pin 255 via the notch 253.

The quick release assembly 26 includes a quick release lever 261, a quick release rod 264, a washer 265, and a nut 267. A washer jack 266 may be provided to receive the washer 265. The quick release lever 261 includes a pair of spaced and holed ears 260 formed on an end thereof. Each ear 260 has a lobe 262 having a high profile portion 262a and a low profile portion 262b (FIG. 4), which is conventional and therefore not described in detail. An end of the quick release rod 264 is mounted between the ears 260 by a pin 263. Assembly of the quick release assembly 26 will be described later.

The board 10 includes an opening 18 in a front end thereof. Each of two lateral side walls defining the opening 18 includes a plurality of spaced indents 181, wherein a protrusion 182 is formed between two adjacent indents 181. The board 10 further includes a pair of mounting plates 101 extending from an underside thereof. The mounting plates 101 include two pairs of aligned holes 102.

Figure 3:
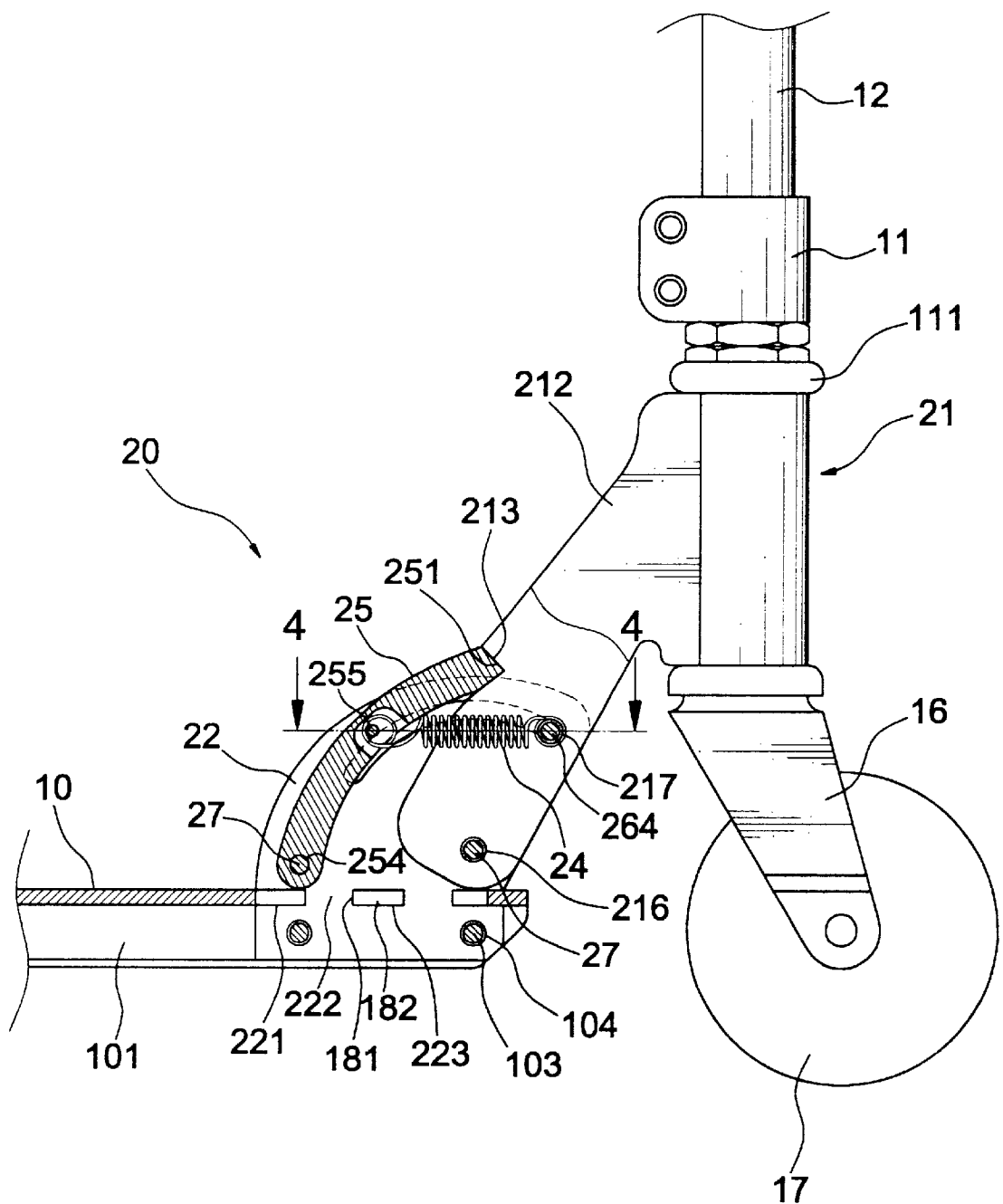
FIG. 3 is a partial side view, partly sectioned, of a portion of the skate board scooter in accordance with the present invention.
Figure 4:
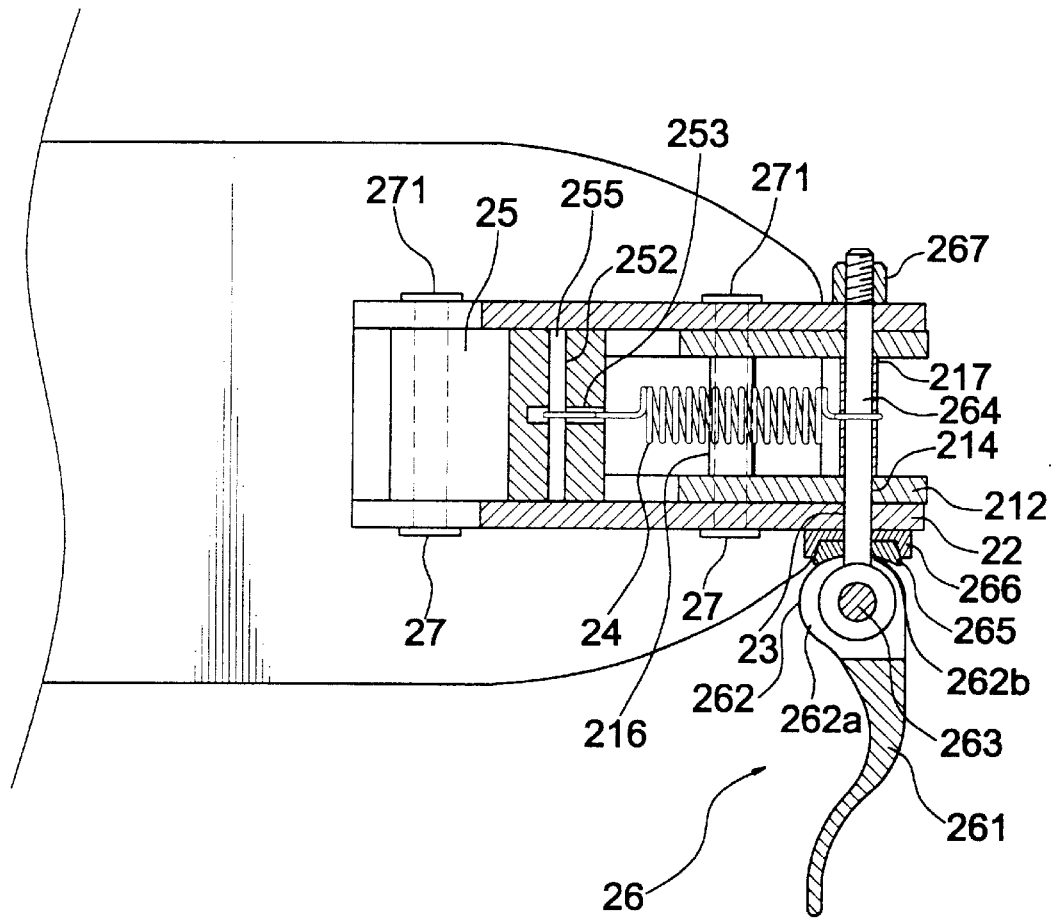
FIG. 4 is a sectional view, in an enlarged scale, taken along line 4—4 in FIG. 3

In assembly, referring to FIGS. 2 through 4, the lower end of each side plate 22 is inserted through the opening 18 of the board 10 with the holes 225 of the side plates 22 respectively aligned with the holes 102 of the mounting plates 101, with the blocks 222 of the side plates 22 respectively engaged with the indents 181 of the opening 18, and with the fixing holes 223 respectively engaged with the protrusions 182 of the opening 18. Two spacer tubes 104 are provided between the side plates 22 and aligned with the holes 225, respectively. Two fasteners (e.g., engaging rods 103 of the type having a screw hole (not shown) in an end face thereof) are respectively extended through the holes 102 of one of the mounting plates 101, the holes 225 of one of the side plates 22, the spacer tubes 104, the holes 225 of the other side plates 22, and the holes 102 of the other mounting plate 101. Two screws 105 are engaged with the screw holes of the engaging rods 103, thereby securely fixing the side plates 22 to the mounting plates 101.

Next, the wings 212 are placed between the side plates 22 with the holes 215 aligned with front aligned holes 224 in the side plates 22. A spacer tube 216 is mounted between the side plates 22 and aligned with the holes 224. A fastener (e.g., an engaging rod 27 of the type having a screw hole (not shown) in an end face thereof) is extended through an associated hole 225 in one of the side plates 22, the hole 215 of one of the wings 212, the spacer tube 216, the hole 215 of the other wing 212, and an associated hole 225 of the other side plate 22. A screw 271 is engaged with the screw hole of the engaging rod 27, thereby pivotally connecting the wings 212 to the side plates 22.

Next, the lower end of the engaging plate 25 is placed between the side plates 22 with the transverse hole 254 aligned with the holes 225 in the rear ends of the side plates 22. A fastener (e.g., an engaging rod 27 of the type having a screw hole (not shown) in an end face thereof) is extended through an associated hole 225 in one of the side plates 22, the transverse hole 254 of the engaging plate 25, and an associated hole 225 of the other side plate 22. A screw 271 is engaged with the screw hole of the engaging rod 27, thereby pivotally connecting the engaging plate 25 to the side plates 22.

After extending through the washer 265 and the washer jack 266 that are attached to an outer surface of one of the side plates 22, the quick release rod 264 is extended through the slot 23 of said one of the side plates 22, a spacer tube 217 that is between the side plates 22 and aligned with the slots 23 of the side plates 22, and the slot 23 of the other side plate 22. The nut 267 is engaged with a threaded portion 264a of the quick release rod 264 that extends beyond the other side plate 22. An end of the quick release rod 264 is mounted between the ears 260 by the above-mentioned pin 263. The other end of the above-mentioned spring 24 is attached to the spacer tube 217, and the first end 251 of the engaging plate 25 is engaged with the notches 213 of the wings 22.

When the quick release lever 261 is in a position shown in FIG. 4, the quick release It1 assembly is in a release state, as the low profile portion 262b of the lobe 262 engages with the washer 265. When the quick release lever 261 is pivoted such that the high profile portion 262a engages with the washer 265, the quick release rod 264 is moved away from the side plates 22. The nut 267 is moved to press against the outer surface of an associated side plate 22. Thus, the quick release assembly 26 is in a locking state preventing pivotal movement of the wings 212 relative to the side plates 22.

Figure 5:
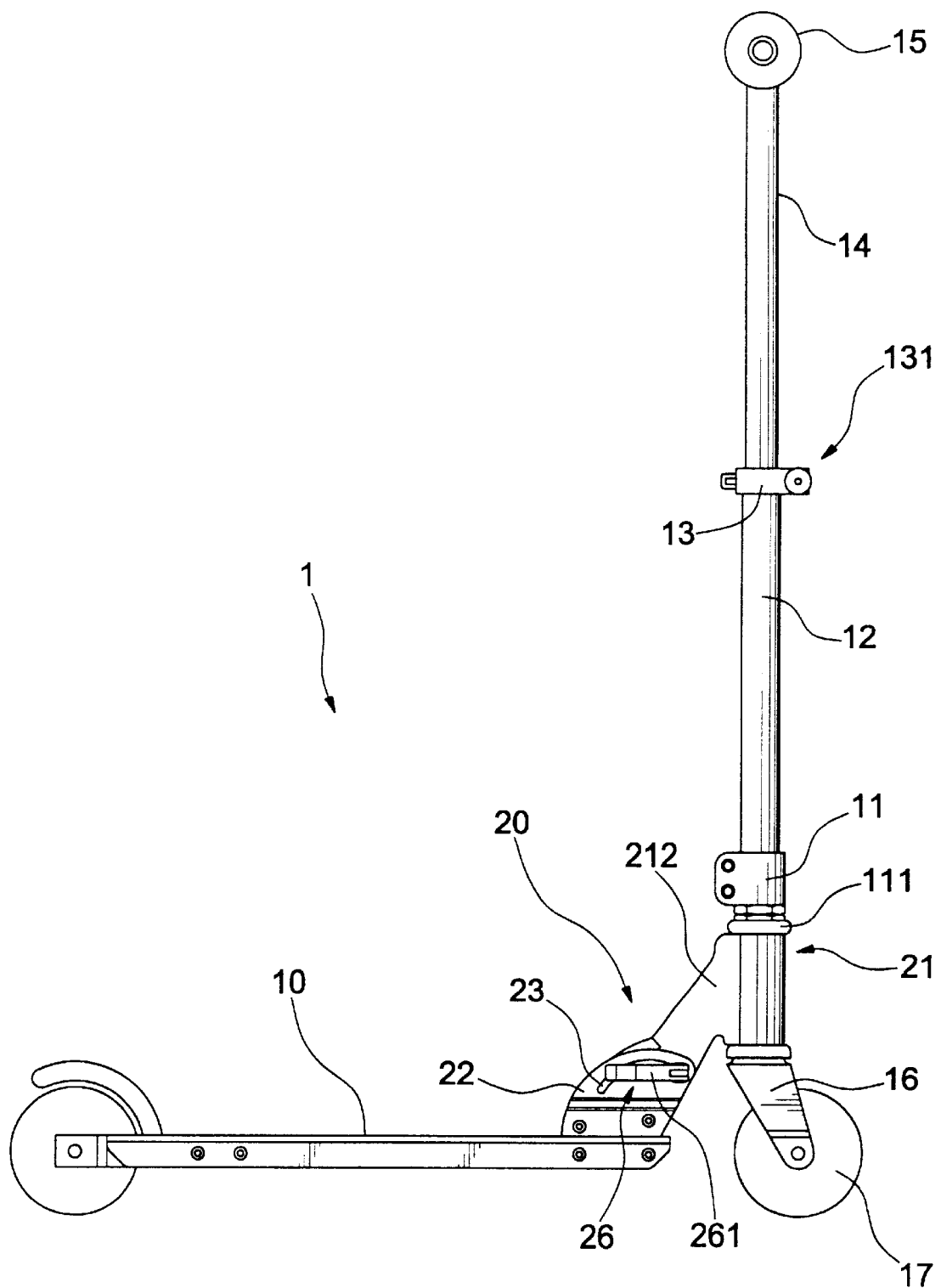
FIG. 5 is a side view of the skate board scooter in an extended state.
Figure 6:
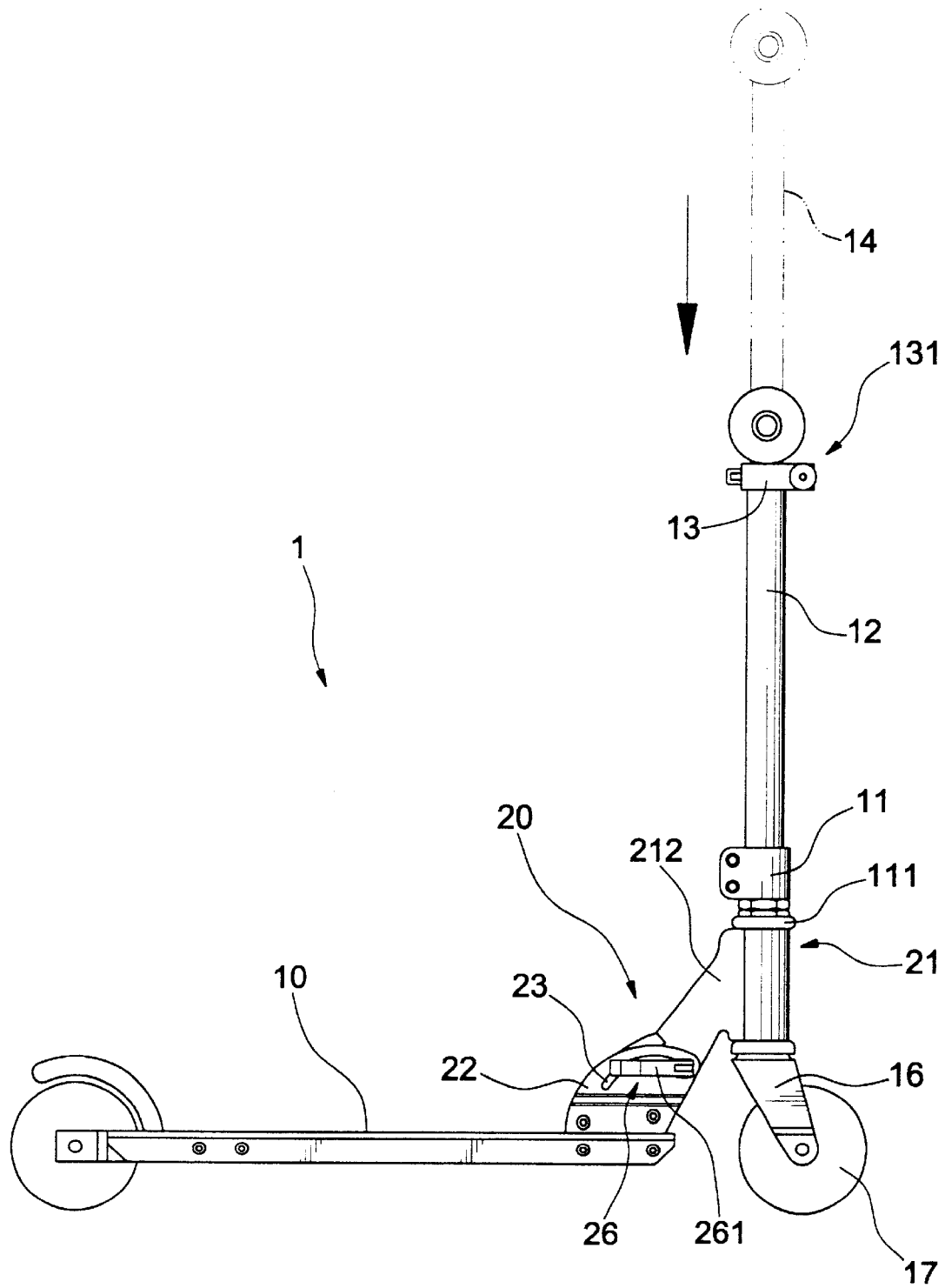
FIG. 6 is a side view similar to FIG. 5, illustrating folding of a steering rod assembly.
Figure 7:
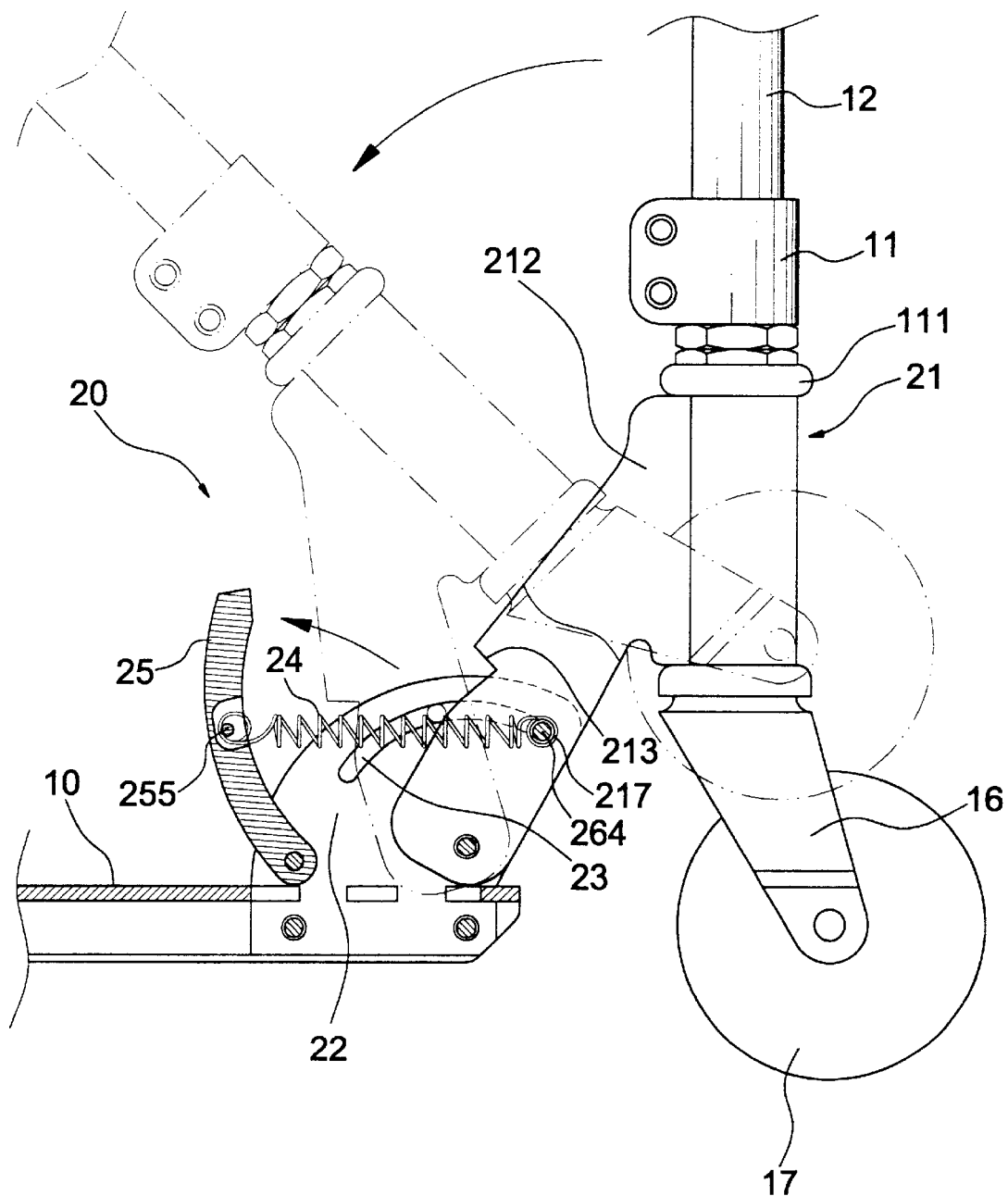
FIG. 7 is a side view similar to FIG. 3, illustrating folding of the skate board scooter.
Figure 8:
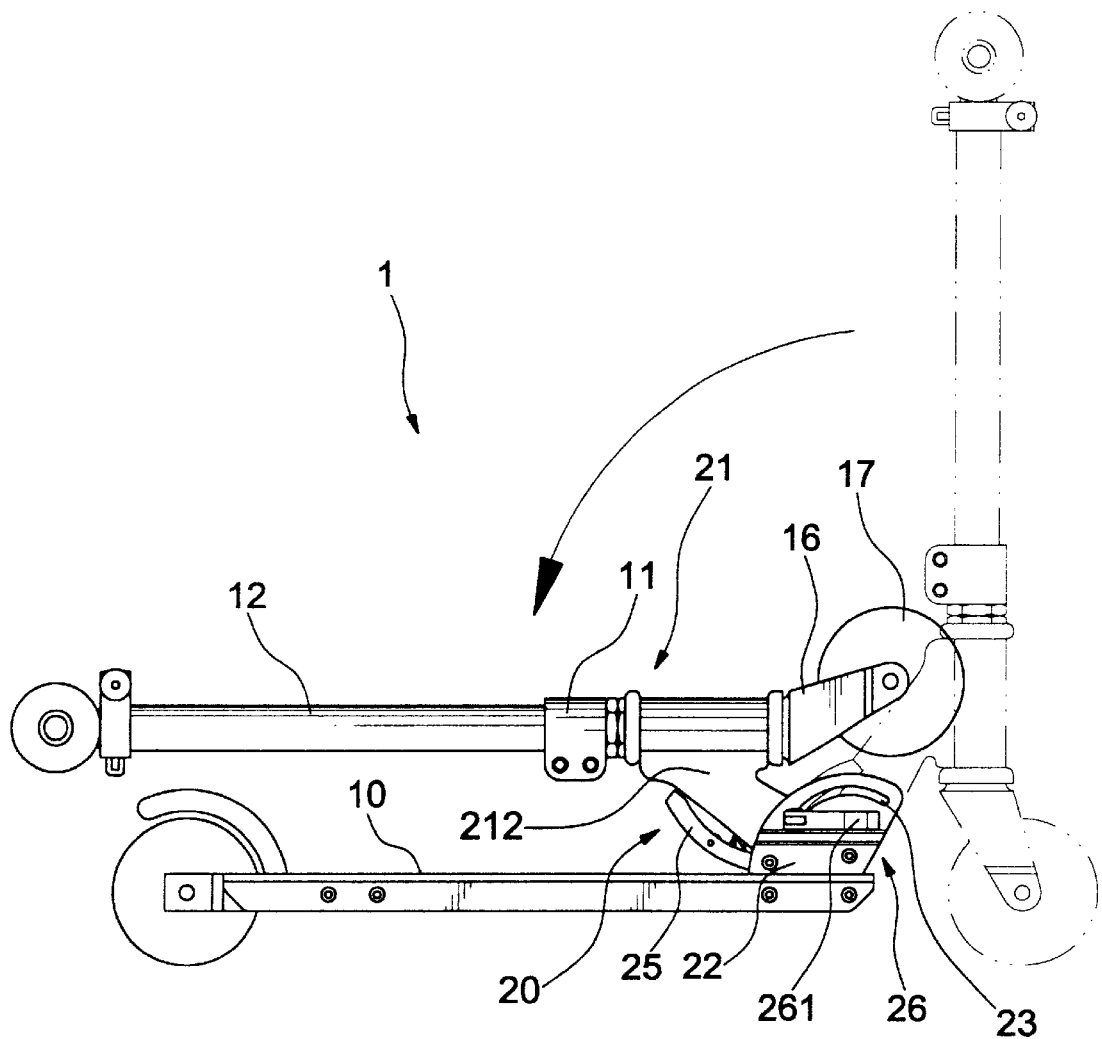
FIG. 8 is a view similar to FIG. 5, wherein the skate board scooter is in a folded state.

FIG. 5 is a side of the skate board scooter in an extended status for skating. When not in use, the upper tube 14 of the steering rod assembly is retracted into in the lower tube 12 and retained in place by the clamping means 13, as shown in FIG. 6. Next, the quick release assembly 26 is switched to its unlocking state to allow pivotal movement of the wings 212 and the sleeve 21 relatively to the side plates 22, as indicated by phantom lines in FIG. 7. Thus, the steering rod assembly can be folded to a position shown in FIG. 8, and the quick release assembly is then switched to its locking state to retain the steering rod assembly in place. It is noted that the quick release rod 264 moves along the arcuate slots 23 of the side plates 22 during pivotal movement of the wings 212 and the sleeve 21 relative to the side plates 22.

According to the above description, it is appreciated that the skate board scooter in accordance with the present invention does not require any welding/soldering work during assembly, which may save labor and reduce the manufacture cost.

Although the invention has been explained in relation to its preferred embodiment, it is to be understood that many other possible modifications and variations can be made without departing from the scope of the invention as hereinafter claimed.

What is claimed is:

1. A skate board scooter comprising:
   a board including an opening and an underside, the board further including two mounting plates extended from the underside thereof,
   two side plates each having a lower end extended through the opening of the board and securely attached to an associated said mounting plate;
   a steering rod assembly;
   a sleeve rotatably holding the steering rod assembly, the sleeve including two wings extended from an outer periphery thereof, each said wing being pivotally attached between the side plates, each said wing including a notch;

an engaging member including a first end releasably engaged with the notches of the wings and a second end pivotally attached between the side plates; and a quick release assembly mounted to the side plates for releasably retaining the wings in place relative to the side plates when the quick release assembly is in a locking state, the wings being pivotally movable relative to the side plates when the quick release assembly is in a release state.

2. The skate board scooter as claimed in claim 1, further comprising at least one spacer tube mounted between the side plates.

3. The skate board scooter as claimed in claim 1, further comprising at least one spacer tube mounted between the wings.

4. The skate board scooter as claimed in claim 1, wherein each said side plate includes a cutout in an outer surface thereof, a plurality of blocks being formed in each said cutout, a fixing hole being defined between two adjacent said blocks, the opening of the board being defined by two lateral sides each having a plurality of indents, thereby defining a protrusion between each two adjacent said indents, each said indent being engaged with an associated said block, and each said protrusion being engaged with an associated said fixing hole.

5. The skate board scooter as claimed in claim 1, wherein each said side plate includes an arcuate slot in an upper end thereof, the quick release assembly including:

a washer mounted to an outer surface of one of the side plates;

a quick release rod including a first end and a second end, the quick release rod extending through the washer and the arcuate slots with the second end extended beyond an outer surface of the other side plate;

a nut securely engaged with the second end of the quick release rod;

a quick release lever attached to the first end of the quick release rod, the quick release lever being manually pivotable between the locking state and the release state.

6. The skate board scooter as claimed in claim 5, further comprising a washer jack between the washer and the outer surface of said one of the side plates.

7. The skate board scooter as claimed in claim 5, further comprising a spacer tube mounted between the wings, the quick release rod extending through the spacer tube.

8. The skate board scooter as claimed in claim 7, further comprising a spring including a first end attached to the spacer tube and a second end attached to the engaging member.

9. The skate board scooter as claimed in claim 8, wherein the engaging member includes a transverse hole, a pin being mounted in the transverse hole, the engaging member further including a notch defined in a side thereof that faces the wings, the notch being communicated with the transverse hole, the second end of the spring being attached to the pin via the notch.

* * * * *